United States Patent
Smith et al.

(10) Patent No.: US 7,925,834 B2
(45) Date of Patent: Apr. 12, 2011

(54) TRACKING TEMPORAL USE ASSOCIATED WITH CACHE EVICTIONS

(75) Inventors: Peter J. Smith, Folsom, CA (US); Mongkol Ekpanyapong, Orangevale, CA (US); Harikrishna Baliga, Folsom, CA (US); Ilhyun Kim, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 11/967,191

(22) Filed: Dec. 29, 2007

(65) Prior Publication Data

US 2009/0172285 A1 Jul. 2, 2009

(51) Int. Cl.
*G06F 12/08* (2006.01)
(52) U.S. Cl. .................. 711/125; 711/136; 711/E12.02
(58) Field of Classification Search .................. None
See application file for complete search history.

(56) References Cited

U.S. PATENT DOCUMENTS

2006/0230235 A1* 10/2006 O'Connor et al. ............ 711/133
2008/0065865 A1* 3/2008 Kim et al. .................... 712/225

* cited by examiner

*Primary Examiner* — Denise Tran
(74) *Attorney, Agent, or Firm* — Trop, Pruner & Hu, P.C.

(57) ABSTRACT

A method and apparatus for tracking temporal use associated with cache evictions to reduce allocations in a victim cache is disclosed. Access data for a number of sets of instructions in an instruction cache is tracked at least until the data for one or more of the sets reach a predetermined threshold condition. Determinations whether to allocate entry storage in the victim cache may be made responsive in part to the access data for sets reaching the predetermined threshold condition. A micro-operation can be inserted into the execution pipeline in part to synchronize the access data for all the sets. Upon retirement of the micro-operation from the execution pipeline, access data for the sets can be synchronized and/or any previously allocated entry storage in the victim cache can be invalidated.

16 Claims, 4 Drawing Sheets

TRACKING TEMPORAL USE ASSOCIATED WITH CACHE EVICTIONS

FIELD OF THE DISCLOSURE

This disclosure relates generally to the field of microprocessors. In particular, the disclosure relates to tracking temporal use associated with cache evictions.

BACKGROUND OF THE DISCLOSURE

In modern processors, execution pipelines are often used. Instructions are provided to the front end of the pipeline by various arrays, buffers, and caches. Such front-end arrays that contain instruction lines, may also includes self-modifying code (SMC) bits to detect which instruction lines may have been overwritten by self-modifying or cross-modifying code.

It will be appreciated that for correct functionality considerations such as processor inclusion, any instruction line that has been delivered into the execution pipeline may later need to be re-delivered in an unmodified state. Therefore, deallocation or eviction of the line, in particular from an instruction cache, cannot take place until all instructions from that line are no longer being processed in the execution pipeline.

One technique to protect such instruction lines from being evicted is to employ a victim cache to hold evicted lines until it can be determined that no instructions from that line are being processed in the execution pipeline. One way to make such a determination is to insert a special micro-operation into the pipeline when an entry is allocated into the victim cache. When that micro-operation retires in sequential order, any instructions from that line that were in front of the micro-operation will have been retired as well and the corresponding entry can be deallocated from the victim cache.

Design constraints may limit a victim cache to store only a few entries (e.g. four or eight). If too many instruction lines are evicted from the instruction cache prior to a victim cache deallocation, the victim cache can fill up resulting in unwanted stalls for the execution pipeline. Furthermore, insertion of numerous special micro-operations into the execution pipeline may cause further degradation to overall performance. Especially for heavy workloads of new instructions where poorly predicted branching may occur, the performance degradation may be significant.

Increasing the victim cache size may reduce the number of stalls, but may not improve upon the numerous special micro-operations inserted into the execution pipeline. Moreover an increased victim cache size comes only at a tradeoff of reducing available area for other circuitry and potentially increasing critical timing paths. To date, other alternative solutions have not been adequately explored.

DESCRIPTION OF THE DRAWINGS

The present invention is illustrated by way of example and not limitation in the figures of the accompanying drawings.

DETAILED DESCRIPTION

A method and apparatus for tracking temporal use associated with cache evictions to reduce the number of allocations in a victim cache is disclosed herein. For one embodiment, access data for a number of sets of instructions stored in an instruction cache is tracked at least until the data for one or more of those sets reaches a predetermined threshold condition. Upon eviction of an entry from the instruction cache, a determination whether to allocate entry storage in the victim cache depends in part on the access data for sets reaching the predetermined threshold condition. If it is determined that the threshold condition has not been met, then the entry may be evicted from the instruction cache without requiring victim cache allocation. If it is determined in the affirmative to allocate the entry storage, a micro-operation can be inserted into the execution pipeline in part to synchronize the access data for all the sets. Then upon retirement of the micro-operation from the execution pipeline, the access data is synchronized with retirement and the previously allocated entry storage in the victim cache can be released or invalidated.

By employing such a technique, a substantial percentage of victim cache allocations may be filtered and/or avoided and the victim cache may be reduced or eliminated without significantly impacting processor performance.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
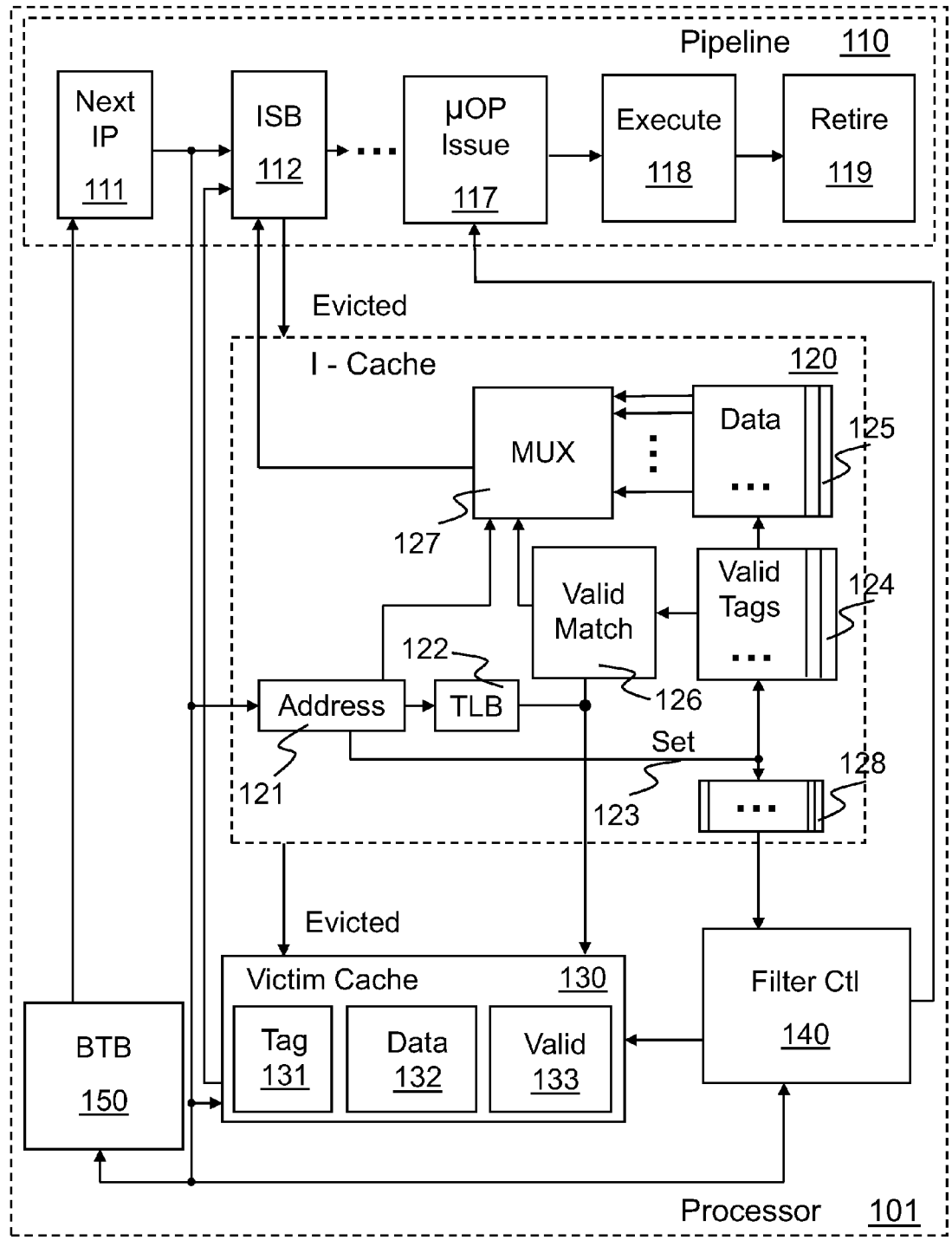
FIG. 1 illustrates a processor according to embodiments of the invention for tracking temporal use associated with instruction cache evictions to reduce the number of allocations in a victim cache.

FIG. 1 illustrates a processor 101 according to embodiments of the invention for tracking temporal use associated with instruction cache evictions to reduce allocations in a victim cache. Processor 101 includes an instruction cache 120 having a plurality of sets of instruction data 125 for corresponding addresses. For one embodiment, 64 such sets may be assigned according to address bits 11-6 of address 121 provided by next instruction pointer stage 111 of execution pipeline 110. Filter control unit 140 tracks access data 128 for the sets of instruction data 125 in instruction cache 120 at least until the access data for one or more of the sets reaches a predetermined threshold condition.

Execution pipeline 110 accesses the instruction cache 120 through next instruction pointer stage 111 and instruction streaming buffer 112. Execution pipeline 110 also includes micro-operation issue stage 117 to issue, for execution by execution stage 118, micro-operations corresponding to instructions of the sets of instruction data 125 and/or instruction streaming buffer 112 and/or victim cache 130. Execution pipeline 110 also includes retirement stage 119 to retire the micro-operations upon completion of their execution by execution stage 118.

When entries are evicted from instruction cache 120, victim cache 130 allocates an entry storage in tag storage 131, data storage 132 and valid storage 133 as determined by filter control unit 140 responsive at least in part to the access data 128 for said one or more of the sets of instruction data 125 reaching the predetermined threshold condition. For one embodiment, filter control unit 140 does not permit allocation of entry storage in the victim cache if tracking of the access data 128 has been synchronized and no access data 128 for any one or more of the sets has reached the predetermined threshold condition.

The operation issue stage 117 of execution pipeline 110 issues a victim cache micro-operation into execution pipeline 110 responsive to allocation of an entry storage in the victim cache 130 and/or to synchronize tracking of the access data 128 for the plurality of sets of instruction data 125. Victim cache 130 invalidates the corresponding entry storage that was previously allocated and/or filter control unit 140 synchronizes tracking of access data 128 responsive to the victim cache micro-operation being retired in retirement stage 119 of execution pipeline 110.

Figure 2:
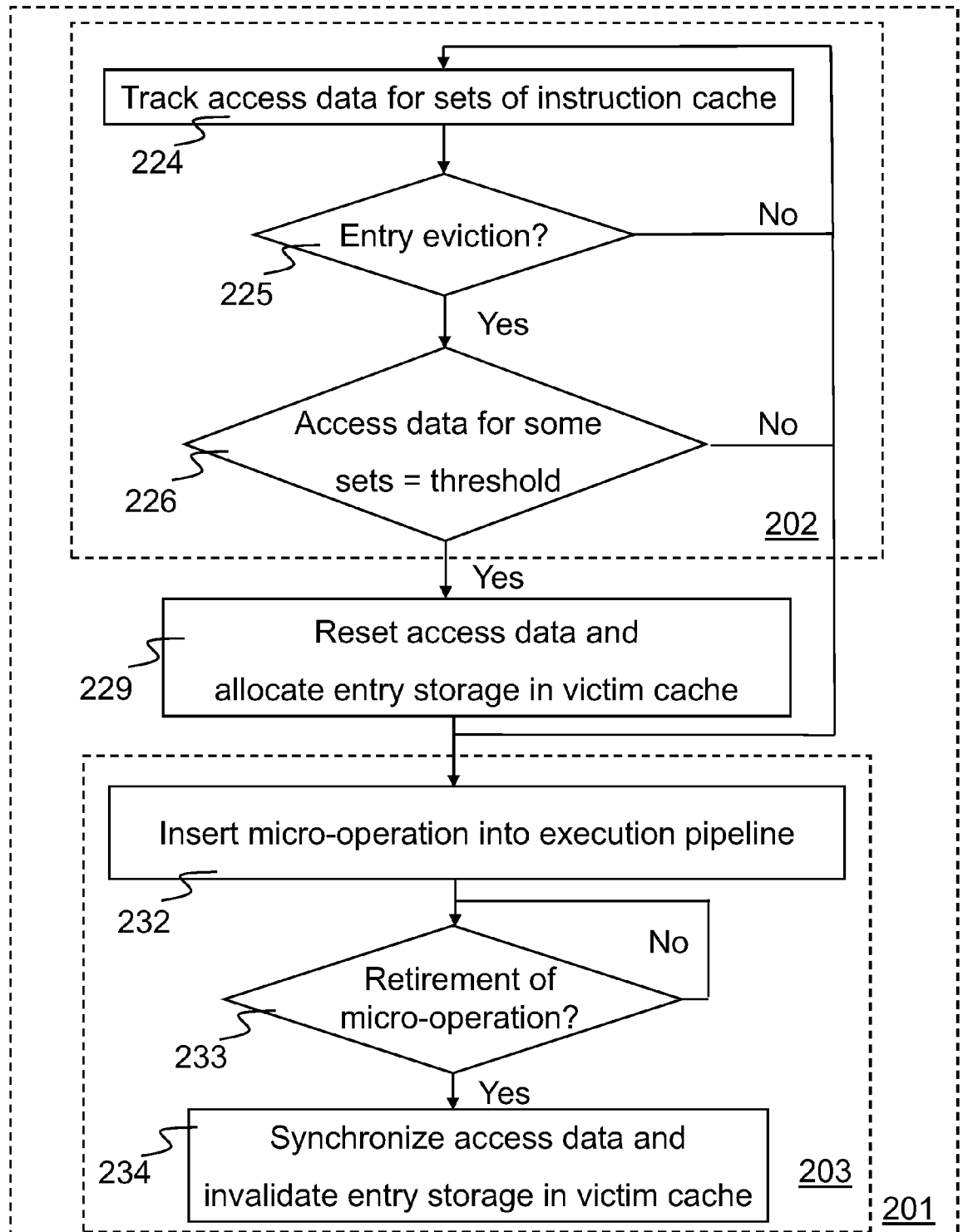
FIG. 2 illustrates a flow diagram for one embodiment of a process to track temporal use associated with instruction cache evictions to reduce the number of allocations in a victim cache.

FIG. 2 illustrates a flow diagram for one embodiment of a process 201 to track temporal use associated with instruction cache evictions to reduce allocations in a victim cache. Process 201 and other processes herein disclosed are performed by processing blocks that may comprise dedicated hardware or software or firmware operation codes executable by general purpose machines or by special purpose machines or by a combination of both. Embodiments of process 201 and other processes herein disclosed may also be computer implemented, wherein a computer may comprise but is not limited to a game player, a personal digital assistant (PDA), a cell phone, an internet phone, a music player, a global positioning system (GPS) device, etc.

In processing block 224 access data for a number of sets in an instruction cache are tracked at least until the access data for one or more of these sets reach a predetermined threshold condition. Until one of these sets reaches the threshold condition, process 201 continues to operate in a filter mode 202. For one embodiment tracking access data comprises keeping a count of relevant pseudo least recently used (LRU) state changes and the predetermined threshold is substantially equal to a pseudo LRU tree depth. For an alternative embodiment tracking access data comprises setting one or more entry-specific in-use bits for each of the plurality of sets when instructions are used and the predetermined threshold is one bit being set (i.e. to 1).

In processing block 225, upon an entry eviction from the instruction cache 120 processing proceeds to processing block 226 where the condition for exiting filter mode 202 is tested (i.e. if access data for one or more of the sets has reached a predetermined threshold condition). While the condition for exiting filter mode 202 is not satisfied, processing resumes in processing block 224 and a substantial percentage of victim cache 130 allocations may be filtered and/or avoided.

When an entry has been evicted from the instruction cache 120 as determined in processing block 225 and access data for one or more of the sets has reached a predetermined threshold condition as determined in processing block 226, processing proceeds to processing block 229 where access data for all sets may be reset and entry storage is allocated in victim cache 130. While tracking access data for sets in the instruction cache will resume in processing block 224, it will be appreciated that the processing flow has now entered synchronization mode 203

In processing block 232 a victim cache micro-operation is inserted into execution pipeline 110 and access data tracking may be reset, the victim cache micro-operation being inserted at least in part to synchronize tracking of access data. In processing block 233 the synchronization mode 203 of process 201 waits for retirement of the victim cache microoperation in execution pipeline 110, and upon such retirement proceeds to processing block 234 where victim cache 130 invalidates the corresponding entry storage that was previously allocated and/or filter control unit 140 synchronizes tracking of access data.

Figure 3:
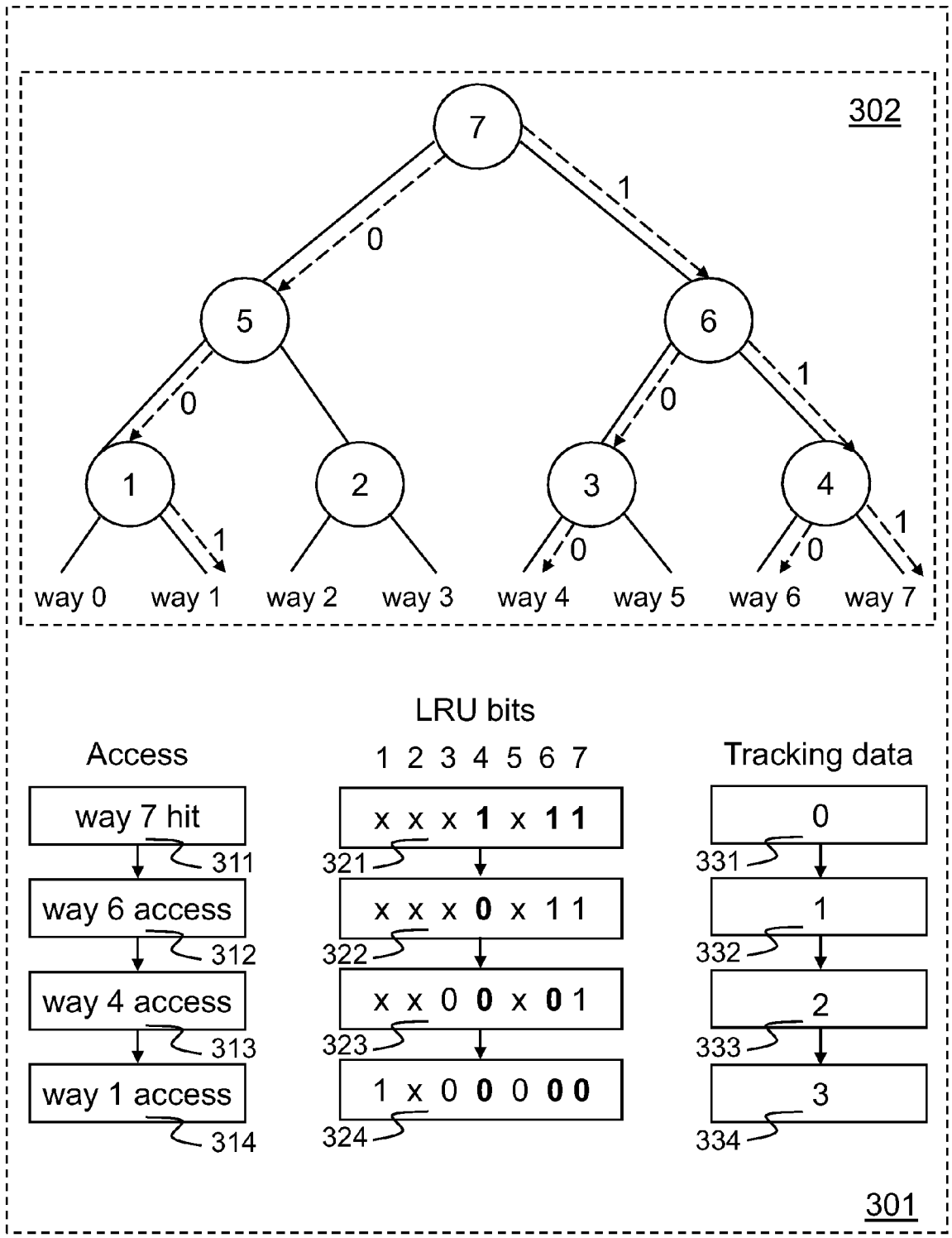
FIG. 3 illustrates a flow diagram for an embodiment of a process using relevant pseudo least recently used (LRU) state changes to track temporal use associated with instruction cache evictions to reduce the number of allocations in a victim cache.

FIG. 3 illustrates a flow diagram for an embodiment of a process 301 using relevant pseudo least recently used (LRU) state changes to track temporal use associated with instruction cache evictions to reduce allocations in a victim cache. Tracking in process blocks 331-334 of access data in process blocks 321-324 comprises a count of relevant pseudo least recently used (LRU) state changes, which is performed for each of the plurality of sets. The predetermined threshold condition of this embodiment is an accumulated number of relevant pseudo, LRU state changes that is substantially equal to the pseudo LRU tree 302 depth, which in this case is a depth of three. Thus three accesses to different ways that each set a relevant pseudo LRU bit for a particular set, and then being followed by an instruction cache miss can lead to an eviction. This sequence is substantially the fastest sequence that can lead to an eviction requiring an entry allocation in the victim cache or some other resolution, for example, a pipeline stall. The process will be illustrated in greater detail below.

The access of processing block 311 is a cache-hit access to way 7. This access is reflected along the far right path through nodes 7, 6, and 4 in pseudo LRU tree 302, which is labeled with all ones (indicating access to the right subtree at each node). In the LRU bits of block 321 corresponding bits 7, 6 and 4 are set to all ones and it is unknown what values are held by bits 1, 2, 3, and 5. At this point, way 7 becomes the most recently used (MRU) entry and tracking data is set to zero (0) in processing block 331. The relevant pseudo LRU state changes that can occur for way 7 would be in bits 7, 6 and 4.

The access of processing block 312 is an access to way 6. This access is reflected along the path through nodes 7, 6, and 3 in pseudo LRU tree 302, which is labeled with two ones and a zero (this time indicating access to the left subtree at node 4). In the LRU bits of block 322 corresponding bits 7, 6 and 4 are set to 1, 1 and 0 respectively. At this point, one relevant pseudo LRU state change has occurred (in bit 4) and tracking data is set to one (1) in processing block 332.

The access of processing block 313 is an access to way 4. This access is reflected along the path through nodes 7, 6, and 3 in pseudo LRU tree 302, which is labeled with a one and two zeros (indicating access to the left subtrees at nodes 6 and 3). In the LRU bits of block 323 corresponding bits 7, 6 and 3 are set to 1, 0, 0 respectively. One more relevant pseudo LRU state change has occurred (in bit 6) and tracking data is incremented to two (2) in processing block 333.

The access of processing block 314 is an access to way 1. This access is reflected along the path through nodes 7, 5, and 1 in pseudo LRU tree 302, which is labeled with two zeros and a one (indicating access to the left subtrees at nodes 7 and 5, but to the tree at node 1). In the LRU bits of block 324 corresponding bits 7, 5 and 1 are set to 0, 0, 1 respectively. One more relevant pseudo LRU state change has occurred (in bit 7) and tracking data is incremented to three (3) in processing block 334. Thus access data for way 7 has reached the predetermined threshold condition.

It will be appreciated that while process 301 illustrates an eight-way cache and a pseudo LRU tree 302 depth of three, the process may be similarly applicable to a four-way cache and a pseudo LRU tree depth of two, or any other variation thereof. It will also be appreciated that some but not all pseudo-LRU states and transitions may need to be considered when tracking access data. It will further be appreciated that an instruction-cache can potentially evict a non-LRU entry, or even the MRU entry, for example on serializing conditions, but in such cases there will be a point where there are no instructions in execution pipeline 110 and at such point tracking of access data in filter control 140 may be reset and synchronized.

Figure 4:
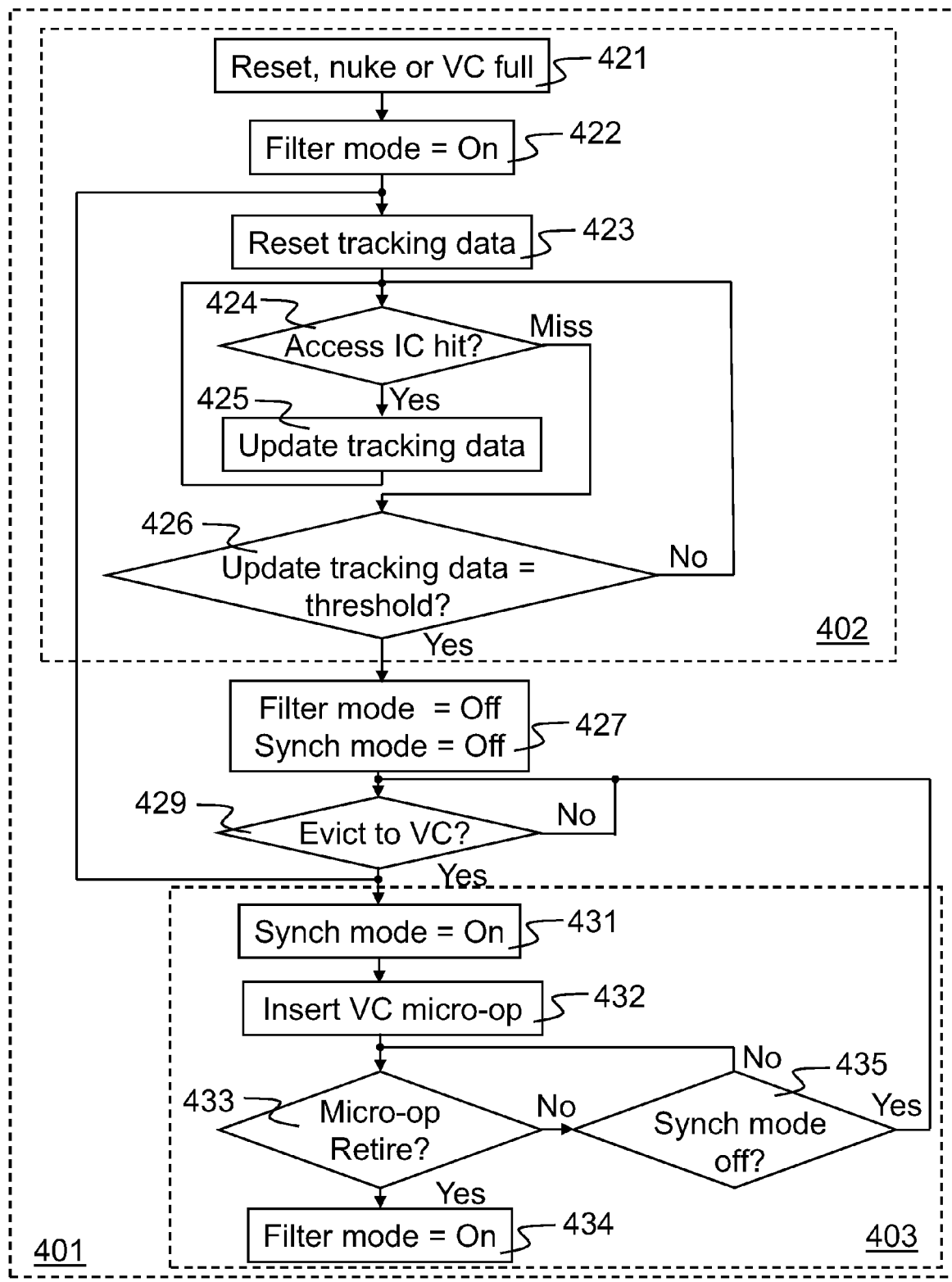
FIG. 4 illustrates a flow diagram for an alternative embodiment of a process to track temporal use associated with instruction cache evictions to reduce the number of allocations in a victim cache.

FIG. 4 illustrates a flow diagram for an alternative embodiment of a process 401 to track temporal use associated with instruction cache evictions to reduce allocations in a victim cache. In processing block 421 as a result of a reset, a nuke event or a victim-cache-full event, there comes a point where there are no instructions in execution pipeline 110 and at such point tracking of access data in filter control 140 may be reset and synchronized. Therefore in processing block 422, filter mode is turned on and evictions from instruction cache 120 may be filtered by filter control 140 in the filter mode 402 of process 401. In processing block 423 tracking of access data is reset in filter control 140.

In processing block 424 accesses to sets in instruction cache 120 are being tracked by filter control 140. If the access is an instruction cache hit, the tracking of access data is updated in processing block 425 and processing continues in processing block 424. If the access is an instruction cache miss, the tracking of access data is updated and tested in processing block 426 to see if a threshold has been reached. If not processing continues in processing block 424 and filter mode 402 of process 401 at least until the access data for one or more of the sets reaches the predetermined threshold condition. While the condition of processing block 426 for exiting filter mode 402 is not satisfied, processing continues in this manner and a substantial percentage of victim cache 130 allocations may be filtered and/or avoided.

If the predetermined threshold condition is reached in processing block 426, then both filter mode and synchronization mode are turned off in processing block 427 and evictions from instruction cache 120 can no longer be filtered by filter control 140.

Processing block 429 waits for instruction cache 120 to evict an entry to victim cache 130. In some cases there may be no entries that are available for allocation (i.e. the victim cache may be full or may not exist) which could result in the pipeline being flushed and the tracking data being reset. If the victim cache has an available entry, then two things happen: (1) In processing block 423 tracking of access data is reset in filter control unit 140 and processing continues as described above in processing blocks 424, 425 and 426; (2) In processing block 431 synchronization mode is turned on for synchronizing the tracking of access data in synchronization mode 403 of process 401. In processing block 432 a micro-operation is inserted into execution pipeline 110. When it is determined that the micro-operation has retired in processing block 433, then the tracking of access data is synchronized, and filter mode is turned on in processing block 434 so that evictions from instruction cache 120 may again be filtered by filter control 140. It will also be appreciated that upon such retirement of that micro-operation, victim cache 130 can invalidate the corresponding entry storage that would have been allocated responsive to processing block 429.

On the other hand, if it is discovered in processing block 435 that synchronization mode has been turned off (i.e. by processing block 427) before the micro-operation has retired, then processing resumes as described above with processing block 429 waiting for instruction cache 120 to evict another entry to victim cache 130.

For some alternative embodiments tracking may be performed using multiple thresholds, and synchronized using multiple access conditions. It will also be appreciated that in some embodiments tracking may be performed for accesses of alternative cache structures that may benefit from temporal knowledge of evicted entries.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A computer implemented method comprising:
   tracking access data for a plurality of sets in an instruction cache at least until said access data for one or more of said sets reaches a threshold condition, said access data comprising a count of relevant pseudo least recently used (LRU) state changes for each of the plurality of sets;
   inserting, responsive at least in part to said access data for said one or more of the sets reaching the threshold condition, an operation into an execution pipeline at least in part to synchronize tracking of said access data for the plurality of sets;
   determining whether to allocate an entry storage in a victim cache responsive at least in part to said access data for said one or more of the sets reaching the threshold condition; and
   invalidating said entry storage in the victim cache responsive to a retirement of said operation from the execution pipeline.

2. The method of claim 1 wherein the threshold condition is substantially equal to a pseudo LRU tree depth.

3. The method of claim 2 wherein the pseudo LRU tree depth is three.

4. The method of claim 1 wherein said access data comprises one or more entry-specific in-use bit for each of the plurality of sets.

5. The method of claim 4 wherein the threshold condition is one.

6. The method of claim 1 wherein said determining does not allocate the entry storage in the victim cache if the access data is synchronized and no access data for any one or more of the sets has reached the threshold condition.

7. An article of manufacture to perform the method of claim 6, the article of manufacture comprising:
   a non-transitory machine-medium including data that, when accessed by a machine, causes the machine to perform the method of claim 6.

8. An apparatus comprising:
   an instruction cache having a plurality of sets of instruction data for corresponding addresses;
   a filter control unit to track access data for the plurality of sets of instruction data in the instruction cache at least until the access data for one or more of said sets reaches a threshold condition, said access data comprising a count of relevant pseudo least recently used (LRU) state changes for each of the plurality of sets;
   an execution pipeline to access the instruction cache, the execution pipeline having an operation issue stage to issue, for execution, a plurality of operations including a first operation corresponding to an instruction of said one or more sets of instruction data, and the execution pipeline having a retirement stage to retire the plurality of operations upon completion of their execution;
   the operation issue stage of the execution pipeline to issue a second operation of the plurality of operations into the execution pipeline responsive to the allocation of the entry storage in a victim cache, the second operation being issued at least in part to synchronize tracking of the access data for the plurality of sets of instruction data; and the victim cache to allocate an entry storage of a plurality of entry storages in the victim cache as determined by the filter control unit responsive at least in part to the access data for said one or more of the sets of instruction data reaching the threshold condition, said victim cache to invalidate the allocated entry storage responsive to the first operation being retired in the retirement stage of the execution pipeline.

9. The apparatus of claim 8 wherein the threshold condition is substantially equal to a pseudo LRU tree depth.

10. The apparatus of claim 9 wherein the pseudo LRU tree depth is three.

11. The apparatus of claim 8 wherein said access data comprises one or more entry-specific in-use bit for each of the plurality of sets.

12. The apparatus of claim 11 wherein the threshold condition is one.

13. The apparatus of claim 8 wherein the filter control unit is not to allocate the entry storage in the victim cache if tracking of the access data is synchronized and no access data for any one or more of the sets of instruction data has reached the threshold condition.

14. A processor comprising:
a pipeline including a plurality of stages, one of the stages corresponding to an issue stage;
an instruction cache coupled to the pipeline;
a victim cache coupled to the instruction cache;
a filter control unit coupled to the instruction cache, the victim cache, and the issue stage, wherein the filter control unit is to prevent an entry evicted from the instruction cache from being inserted into the victim cache if access data of the instruction cache has been synchronized and none of the access data has reached a threshold condition and the victim cache is to allocate an entry storage of a plurality of entry storages in the victim cache as determined by the filter control unit responsive at least in part to the access data reaching the threshold condition, the victim cache to invalidate the allocated entry storage responsive to an operation being retired in a retirement stage of the pipeline, the access data comprising a count of relevant pseudo least recently used (LRU) state changes for sets of the instruction cache.

15. The processor of claim 14 wherein the filter control unit is to insert the evicted entry into the victim cache if the access data has reached the threshold condition.

16. The processor of claim 15 wherein the filter control unit is to invalidate the inserted evicted entry from the victim cache responsive to retirement of a synchronization operation from the pipeline.

* * * * *